United States Patent [19]

McAllister et al.

[11] Patent Number: 5,666,400

[45] Date of Patent: Sep. 9, 1997

[54] INTELLIGENT RECOGNITION

[75] Inventors: Alex McAllister, Wheaton, Md.; James Curry, Herndon, Va.; Frank Meador, Baltimore, Md.

[73] Assignee: Bell Atlantic Network Services, Inc., Arlington, Va.

[21] Appl. No.: 271,887

[22] Filed: Jul. 7, 1994

Related U.S. Application Data

[63] Continuation-in-part of Ser. No. 271,885, Jul. 7, 1994, Pat. No. 5,553,119.
[51] Int. Cl.$^6$ .............................. G06K 9/00; G10L 5/02
[52] U.S. Cl. ............................. 379/67; 379/189; 379/201; 379/207
[58] Field of Search ......................... 379/201, 207, 379/88, 67, 189, 188, 196, 197, 198, 199; 340/825.3, 825.31, 825.33, 825.34

[56] References Cited

U.S. PATENT DOCUMENTS

| | | |
|---|---|---|
| 3,192,321 | 6/1965 | Nassimbene . |
| 3,742,938 | 7/1973 | Stern . |
| 3,764,270 | 10/1973 | Collier et al. ........................ 340/279 |
| 3,809,067 | 5/1974 | Hoppesch . |
| 3,842,345 | 10/1974 | Padgitt et al. ........................ 324/371 |
| 3,870,035 | 3/1975 | Sarnoff .............................. 128/2.05 |
| 3,903,726 | 9/1975 | Hirosawa et al. ................... 73/23 |
| 4,093,945 | 6/1978 | Collier et al. ........................ 340/279 |
| 4,337,377 | 6/1982 | Van Riper et al. . |
| 4,458,693 | 7/1984 | Badzinski et al. ................... 128/715 |
| 4,613,845 | 9/1986 | DuBois ............................... 340/52 |
| 4,718,096 | 1/1988 | Meisel ................................ 381/43 |
| 4,757,541 | 7/1988 | Beadles .............................. 381/43 |
| 4,769,845 | 9/1988 | Nakamura ........................... 381/43 |
| 4,841,575 | 6/1989 | Welsh et al. ........................ 381/36 |
| 4,843,377 | 6/1989 | Fuller et al. ........................ 340/573 |
| 4,862,896 | 9/1989 | Reinhold, Jr. et al. .............. 128/696 |
| 4,883,064 | 11/1989 | Olson et al. ........................ 128/696 |
| 4,974,607 | 12/1990 | Miwa ................................. 128/904 |
| 4,975,960 | 12/1990 | Petajan ............................... 381/43 |
| 4,979,206 | 12/1990 | Padden et al. ...................... 379/67 |
| 4,999,613 | 3/1991 | Williamson et al. ................ 340/573 |
| 5,023,901 | 6/1991 | Sloan et al. ........................ 128/697 |
| 5,131,038 | 7/1992 | Puhl .................................. 380/23 |
| 5,163,083 | 11/1992 | Dowden et al. ..................... 379/88 |
| 5,172,698 | 12/1992 | Stanko ............................... 379/38 |
| 5,181,237 | 1/1993 | Dowden et al. ..................... 379/88 |
| 5,185,781 | 2/1993 | Dowden et al. ..................... 379/67 |
| 5,297,194 | 3/1994 | Hunt et al. ......................... 379/88 |
| 5,311,572 | 5/1994 | Friedes .............................. 379/88 |
| 5,377,186 | 12/1994 | Wegner et al. ..................... 379/201 |
| 5,414,755 | 5/1995 | Bahler ............................... 379/189 |
| 5,473,726 | 12/1995 | Marshall ............................ 381/43 |

OTHER PUBLICATIONS

Marshall, *Audio and Infrared Collection of Speech Recognition Data*, U.S. Statutory Invention Registration No. H1496, piblished Oct. 3, 1995.

IBM Technical Disclosure Bulletin, Object Access via Fingerprint Recognition on Telephone Keys, vol. 36 No. 09A Sep. 1993.

*Primary Examiner*—Dwayne Bost
*Assistant Examiner*—Thomas F. Presson
*Attorney, Agent, or Firm*—Lowe, Price, LeBlanc & Becker

[57] ABSTRACT

In a switching system for connecting a call between a calling station and a called station, a system and method of voice recognition using a concentrated or distributed multiplicity of voice recognition and other resources with a facility for selecting an initial resource on the calling station going off-hook by accessing a demographic database and a biometric database using common channel signaling and selecting a prompt to be delivered to the caller from a multiplicity of preselected prompts and reacting to a response by the caller with further addressing of database information to continue to select from said multiplicity of resources the most appropriate resource or resources in reaction to caller utterances. According to another feature the selection of resources is aided by optical means at the calling station delivering information regarding characteristics of the caller including lip movement to permit lip reading.

29 Claims, 6 Drawing Sheets

INTELLIGENT RECOGNITION

RELATED APPLICATIONS

This application is related to and a continuation-in-part of the inventor's application Ser. No. 08/271,885, filed Jul. 7, 1994, now U.S. Pat. No. 5,553,119 for Intelligent Recognition, Ref. No. 680-091.

TECHNICAL FIELD

This invention relates to methods and apparatus for automating various user initiated telephony processes, particularly through the use of improved recognition systems and methodology.

BACKGROUND ART

In the environment of telecommunications systems there has been a steady trend toward automating what was originally operator assistance traffic. Much current activity is directed to responding to directory assistance calls by processing voice frequency instructions from the caller without operator intervention. The instructions are used by an automatic speech recognition unit to generate data signals corresponding to recognized voice frequency signals. The data signals are then used to search a database for a directory listing to derive the desired directory number. A system of this type is described in U.S. Pat. No. 4,979,206 issued Dec. 18, 1990.

Further examples of use of voice recognition in automation of telephone operator assistance calls is found in U.S. Pat. Nos. 5,163,083, issued Nov. 10, 1992; 5,185,781, issued Feb. 9, 1993; and 5,181,237, issued Jan. 19, 1993, to Dowden et al.

Another proposed use for speech recognition in a telecommunications network is voice verification. This is the process of verifying the person's claimed identity by analyzing a sample of that person's voice. This form of security is based on the premise that each person can be uniquely identified by his or her voice. The degree of security afforded by a verification technique depends on how well the verification algorithm discriminates the voice of an authorized user from all unauthorized users. While it would be desirable to use voice verification to verify the identity of a telephone caller, such schemes to date have not been implemented in a fully satisfactory manner. One such proposal for implementing voice verification is described in U.S. Pat. No. 5,297,194, issued Mar. 22, 1994, to Hunt et al.

In an embodiment of a system described in the Hunt et al. Patent a caller attempting to obtain access to services via a telephone network is prompted to enter a spoken password having a plurality of digits. Preferably, the caller is prompted to speak the password beginning with the first digit and ending with a last digit. Each spoken digit of the password is then recognized using a speaker-independent voice recognition algorithm. Following entry of the last digit of the password, a determination is made whether the password is valid. If so, the caller's identity is verified using a voice verification algorithm.

Various suggestions have been made to improve the reliability of voice recognition. An exemplary approach is described in U.S. Pat. No. 4,718,096, issued Jan. 5, 1988, to William S. Meisel. That patent describes a speech recognition system that utilizes a plurality of microphones on a body to detect the speech of a speaker. First, second and third microphones may respectively detect sounds emanating from the speaker's mouth, nose and throat and produce signals representing such sounds. A fourth microphone may detect the fricative and plosive sounds emanating from the speaker's mouth and produce signals representing such sounds. The signals are passed on to a recognition system.

U.S. Pat. No. 4,999,613, issued Mar. 12, 1991, to Williamson et al. for a Remote Confinement System, describes a system which relies upon voice recognition in addition to a plurality of different, unsupervised tests. The tests include an RF test performed continuously with an RF transmitter attached to the prisoner and a receiver at the remote location, a schedulable voice test performed to identify a person as the specified prisoner, and a breath alcohol test to determine the prisoner's sobriety.

U.S. Pat. No. 5,023,901, issued Jun. 11, 1991, to Sloan et al., for a Surveillance System, describes a surveillance system which integrates voice identification with a passive monitoring mechanism. Each remote station includes a voice verification unit to receive data and command signals from the central station and to input and receive active and passive monitoring signals from a specific individual. This includes an electro-acoustic transducer connected to a microphone for receiving an active signal comprising preselected spoken words. The remote station also includes a receiver element connected to receive a passive signal such as a continuous signal transmitted from a specific individual indicating the individual's presence at the designated locality. An anklet/bracelet transmitter worn by the confined person can be used to generate an RF signal as described in the preceding patent and, in addition, sensors may be provided at points of entry-exit of the premises to automatically transmit a signal indicating use.

DISCLOSURE OF THE INVENTION

It is an object of the invention to provide a system and method for accomplishing universal speech recognition on a reliable basis using a unique combination of existing technologies and available equipment.

The new and improved methodology and system involves an initial two step passive and active procedure to preselect the most appropriate technology model or device for each type of caller. The passive feature may be based on numerous factors subject to determination without seeking active participation by the customer or user. One such factor is demographic information which may be determined by identifying the geographic area of origin of the call. This may be accomplished through the use of ANI or Caller ID or any one of a number of other passively determinable factors such as ICLID, DNIC, NNX, area code, time of day, snapshot, date or biometrics. If the profile database constructed for the purpose of making an appropriate choice of recognition technology model or device on the basis of passive features is inconclusive, a second step or active procedure may be initiated. This may take the form of an automated oral query or prompt to solicit a customer or caller response that can be analyzed to select the appropriate recognition model or device following the caller active step. Also the nature of the recognition device may be changed during the course of the information exchange with the caller.

In the inventor's above identified parent application it has been disclosed that a factor in obtaining high efficiency speech recognition is that the speech recognition products of different vendors perform more or less satisfactorily under differing specific circumstances. For example, the equipment of one vendor may provide the best performance for continuous digit recognition, the equipment of another vendor may provide the best performance for speaker dependent recognition, the equipment of still another vendor may provide the . best performance for speaker independent/ word spotting recognition, the equipment of another vendor or different equipment of the same vendor may provide the best performance for male voices or female voices, etc.

As described in the above identified application, which is incorporated herein by reference, this seeming limitation may be utilized to advantage by providing a platform (which may be distributed) which includes speech recognition equipment of varying profiles and/or multiple vendors. The recognition task is then handled by directing a specific recognition question to the type of equipment best able to handle that specific situation. Thus an optimal arrangement might incorporate the algorithms of multiple vendors within a single bus architecture so that multiple vendor boards are placed on the main machine and the operating program directs the signal to be recognized to the most appropriate board for processing. Thus that application describes the use of one or more demographic databases to aid or increase the reliability of speech recognition technology.

According to the present invention an intelligent system and method is provided wherein it is possible to increase the reliability of speech recognition through the use of biometric data or information which can be obtained from the caller both in a passive and active fashion. Such information may be used to provide an indication of the condition, state of anxiety, sobriety or command of mental facilities of the user, and used as an adjunct to determine the nature of prompts or inquiries and the methodology of voice recognition. While the public switched telephone network and radio communication carriers have been used in the past to transmit medical information, including biometric information, this has been for the purpose of providing medical assistance and surveillance. For example, the following patents describe the transmission of varying types of medical information:

U.S. Pat. No. 5,172,698, issued Dec. 22, 1992, to Bruce E. Stanko, describes a telephonic pacemaker monitoring device which utilizes multiple electrode touch pads on the face of the monitoring units for detecting the pacemaker signals or the patient's pulse. The design is intended to eliminate the need to hold the monitor over the patient's chest with one hand while placing the telephone handset against the monitor with the other hand, as is necessary with the chest electrode monitor system. A feedback system is provided wherein the operator at the receiving center determines if the pacemaker signal is being properly transmitted and so informs the user to avoid the necessity for a call back in the case of faulty information being transmitted and recorded.

U.S. Pat. No. 4,458,693, issued Jul. 10, 1994, to Hepp et al. for a Monitoring System, describes an apparatus and technique for monitoring the operation of prosthetic heart valves. The acoustic sensor or microphone is placed in close proximity to the chest of the patient and transfers the sound of the value clicks for recording and analysis.

U.S. Pat. No. 4,337,377, issued Jun. 29, 1982, to Van Riper et al. for a Biologic Apparatus, describes a device for telephonic transmission of biologic signals such as an electrocardiogram, blood pressure, cranial waveforms, and the like using electrodes which may be mounted on the earpiece and mouthpiece of a telephone handset to be placed into contact with the user's chest. The procedure is based upon the use of a portable biologic unit that may be attached to a telephone handset to form a hand held biologic module. The device is specifically described in terms of a pair of integral fixedly positioned spaced pickup electrodes which are positioned to straddle the heart area and pick up an electric cardiac signal.

U.S. Pat. No. 4,883,064, issued Nov. 28, 1989, to Olson et al. describes a method and system for gathering electrocardiographic data utilizing at least three patient leads affixed to the patient.

U.S. Pat. No. 4,974,607, issued Dec. 4, 1990, to Satoru Miwa describes yet another device for collecting bio-body information through the attachment of a plurality of sensors such as an electrocardiograph, sphygmomanometer, thermometer and the like. The detected bio-body data is stored and transmitted by telephone to a medical organization.

U.S. Pat. Nos. 4,862,896 and 3,870,035 describe devices for detecting heart beat conditions and creating auditory signals which are then transmitted by telephone.

U.S. Pat. No. 3,742,938 describes yet another device for making remote cardiac diagnoses of cardiac patients. A small transducer/transmitter picks up the patient's blood pulses and cardiac pacer pulses if present, codes these, and transmits the same through an ordinary telephone transmitter to a processing center.

BRIEF SUMMARY OF THE INVENTION

According to the present invention there is provided a voice recognition platform (which may be distributed), which includes speech recognition equipment of varying types and perhaps of varying vendors. As described in the inventor's aforementioned copending application demographic and visual feedback may be utilized to improve the efficacy of the recognition system and method. According to the present invention the technology is even further improved using biometric feedback obtained in either or both passive or active manners. This input is coupled with the availability of a large variety of prompt or dialogue data wherein the biometric signals interact with the prompt database to attempt to efficaciously utilize the most efficient recognition technology.

It is accordingly an object of the invention to provide a system and method for accomplishing universal speech recognition in the environment of a switched telephone network and most particularly a PSTN.

It is another object of the invention to provide a system and method for accomplishing universal speech recognition for purposes of the transfer of spoken intelligence as well as speaker authentication.

It is yet another object of the invention to provide an improved system and method for accomplishing universal speech recognition on an efficient and economic basis using features and technologies currently available to the public switched telephone network.

It is another object of the invention to provide such a system using a two step passive and active procedure wherein the passive step is transparent to the user and the active step may be transparent to the user with respect to the purpose of the activity.

It is another object of the invention to provide an improved system and method for accomplishing universal speech recognition on a reliable basis using the two step procedure wherein the passive step is at least partially based on biometric data which is unique to the caller and which is sensed using primarily conventional telephone equipment as a platform.

It is a further object of the invention to provide an improved system and method for accomplishing universal speech recognition on a reliable basis using a combination of passive and active determinations which include detection of behavioral information such as anxiety, anger, inebriation and the like.

These and further objects and advantages of the invention will become apparent from the following specification, claims and drawings.

BEST MODE FOR CARRYING OUT THE INVENTION

Figure 1:
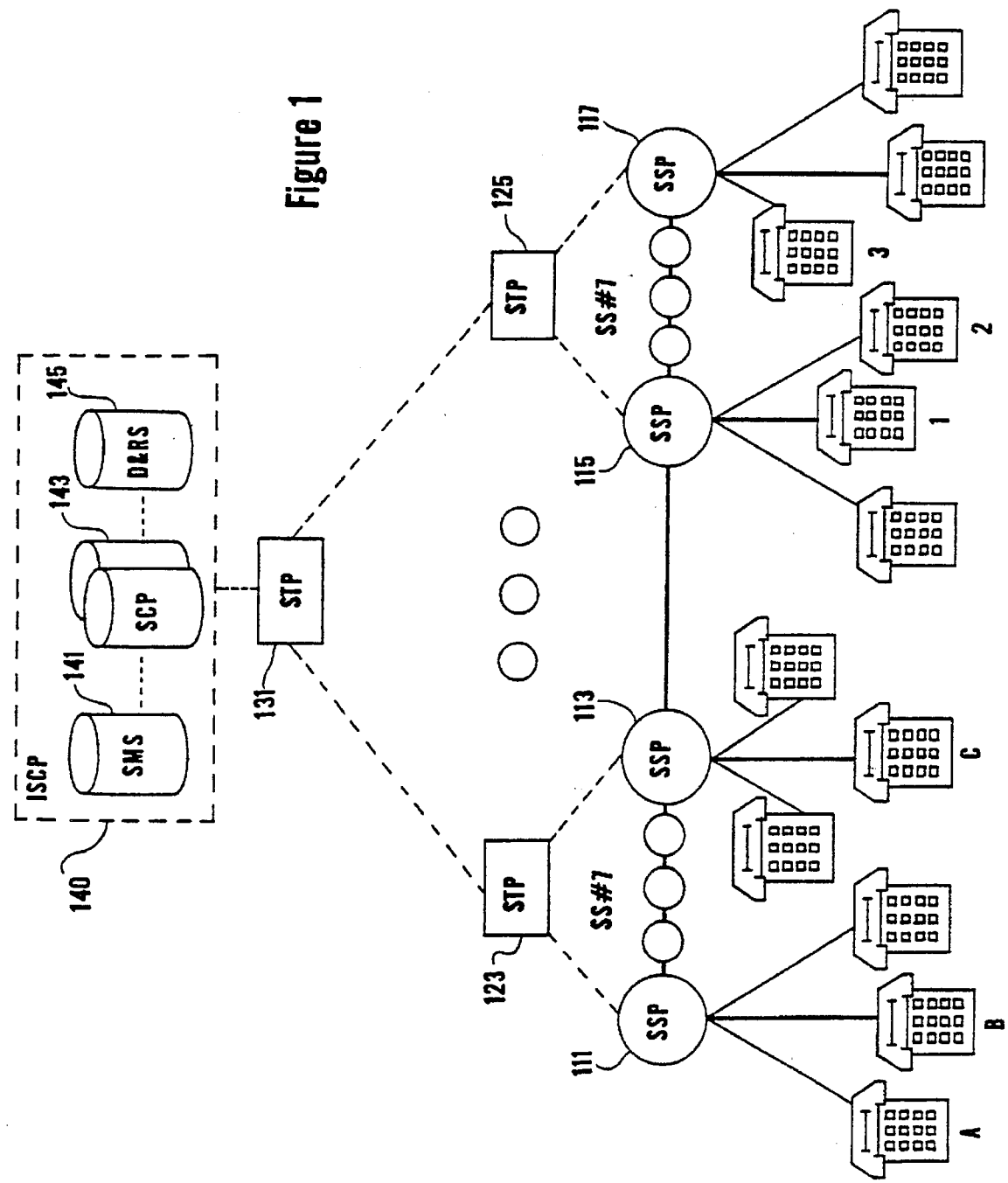
FIG. 1 is a block diagram of a typical Advanced Intelligent Network (AIN) system used in the preferred embodiment of the invention in a public switched telephone network (PSTN) as an environment for implementing the invention.

Referring to FIG. 1 there is shown a typical AIN equipped switched telephone network which provides the preferred implementation for the invention. In the system shown in FIG. 1, each of the central office switching systems are labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls.

As shown in FIG. 1, all of the central office switches are equipped and programmed to serve as SSP's. Such central office switching systems typically consist of a programmable digital switch with CCIS communications capabilities. One example of such a switch is a 5ESS type switch manufactured by AT&T; but other vendors, such as Northern Telecom and Siemens, manufacture comparable digital switches which could serve as the SSP's. A 5ESS type switch is illustrated and described in above described U.S. Pat. No. 4,979,206. While the network illustrated in FIG. 1 shows all central offices functioning as SSP's other AIN implementations provide the SSP functionality only at selected points in the network, and end offices without such functionality forward calls to one of the SSP's.

The SSP's 111 and 113 connect to a first local area STP 123, and the SSP's 115 and 117 connect to a second local area STP 125. The connections to the STP's are for signaling purposes. As indicated by the black dots below STP's 123 and 125, each local area STP can connect to a large number of the SSP's. The central offices or SSP's are interconnected to each other by trunk circuits (illustrated in FIG. 1 as bold lines) for carrying telephone services.

The local area STP's 123 and 125, and any number of other such local area STP's shown as circles between STP's 123 and 125, communicate with a state or regional STP 131. The state or regional STP 131 in turn provides communications with the ISCP 140. The STP hierarchy can be expanded or contracted to as many levels as needed to serve any size area covered by the Advanced Intelligent Network (AIN) and to service any number of stations and central office switches. The links between the central office switching systems and the local area STP's 123 and 125 are typically SS7 type CCIS interoffice data communication channels. The local area STP's are in turn connected to each other and to the regional STP 131 via a packet switched network. The regional STP 131 also communicates with the ISCP 140 via a packet switched network.

The above described data signaling network between the SSP type central offices and the ISCP is preferred, but other signaling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

As shown in FIG. 1, the ISCP 140 is an integrated system. Among other system components, the ISCP 140 includes a Service Management System (SMS) 141, a Data and Reporting System (D&RS) 145 and the actual database referred to as a Service Control Point (SCP) 143. The ISCP also typically includes a terminal subsystem referred to as a Service Creation Environment or SCE (not shown) for programming the data base in the SCP 143 for the services subscribed to by each individual business customer.

Although shown as telephones in FIG. 1, the terminals can comprise any communication device compatible with the line. Where the line is a standard voice grade telephone line, for example, the terminals could include facsimile devices, modems, credit card validation terminals, etc.

Each central office switching system or SSP normally responds to a service request on a local communication line connected thereto, for example an off-hook followed by dialed digit information, to selectively connect the requesting line to another selected local communication line. The connection can be made locally through only the connected central office switching system. For example, for a call from station A to station B the SSP 111 provides the call connection without any connection to another central office. When the called line connects to a distant station, for example when station A calls station C, the connection is made through the connected central office switching system SSP 111 and at least one other central office switching system SSP 113 through the telephone trunks interconnecting the two central office switches.

In CCIS type call processing the local central office suspends the call and sends a query message through one or more of the STP's. The query message goes to the central office to which the called station is connected, referred to as the "terminating" central office; for example, for a call from station A to station C the query would go from originating SSP 111 to terminating SSP 113. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

In an Advanced Intelligent Network (AIN) type system, such as shown in FIG. 1, certain calls receive specialized AIN type processing under control of data files stored in the SCP database 143 within the ISCP 140. In such a network, the SSP type local offices of the public telephone network detect a call processing event identified as an AIN "trigger." For ordinary telephone service calls, there would be no event to trigger AIN processing; and the local and toll office switches would function normally and process such calls as discussed above, without referring to the SCP database for instructions. An SSP office which detects a trigger, however, will suspend call processing, compile a TCAP formatted call data message and forward that message via a common channel interoffice signaling (CCIS) link and STP(s) to the ISCP 140 which includes the SCP database 143. If needed, the ISCP can instruct the central office to obtain and forward additional information. Once sufficient information about the call has reached the ISCP, the ISCP accesses its stored data tables to translate the received message data into a call control message and returns the call control message to the office of the network via CCIS link and STP(s). The SSP then uses the call control message to complete the particular call through the network. The present invention allows a subscriber to interact with the SCP database maintained in the ISCP, to control the implementation of the intelligent recognition of the invention.

Figure 2:
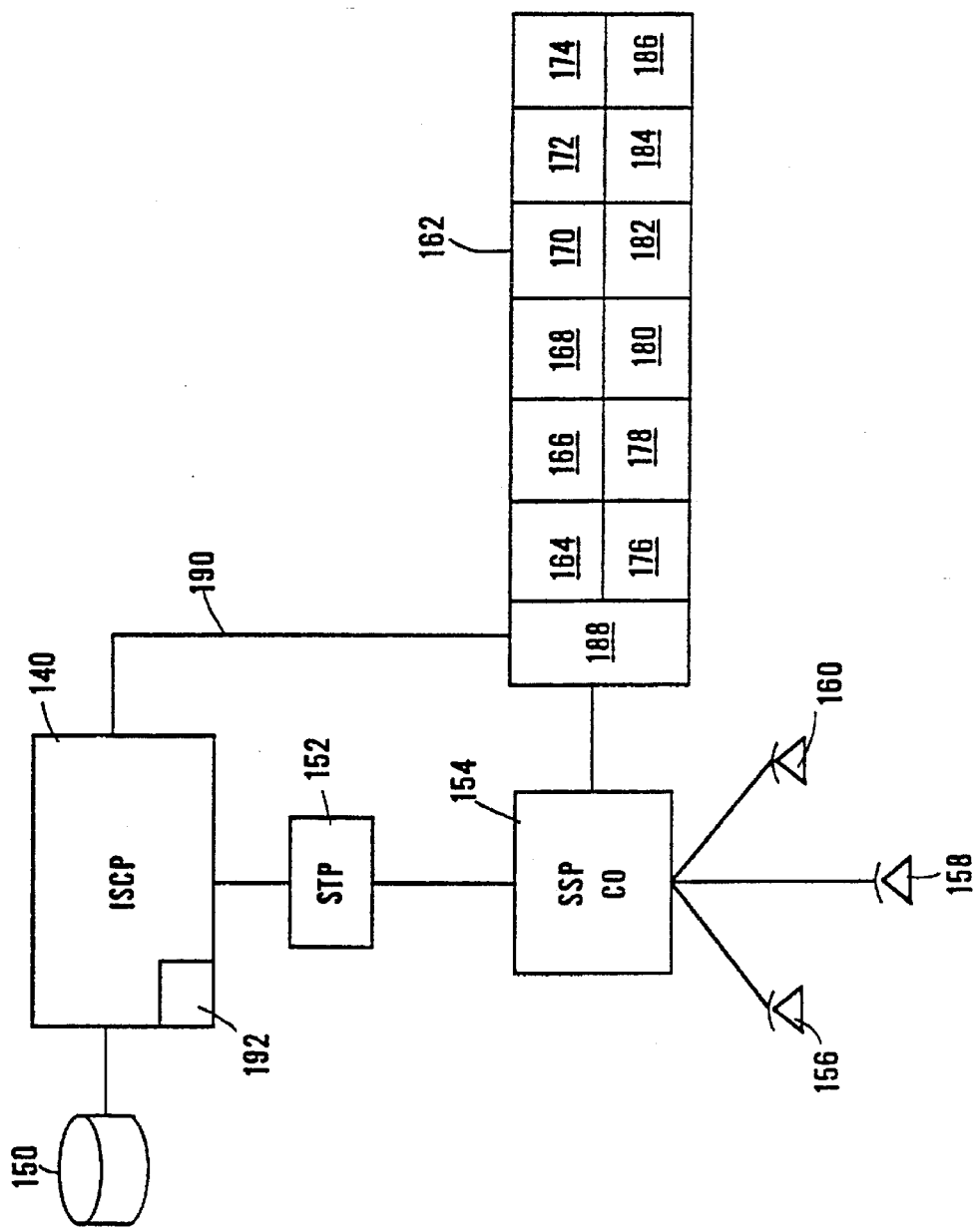
FIG. 2 is a schematic block diagram illustrating a platform for implementing the invention according to one embodiment.

Referring to FIG. 2 the ISCP 140 is connected in the general architecture illustrated in FIG. 2 to one or more STP'S 152 and to an SSP and central office 154. The central office 154 may be connected to telephone stations 156–160 and to other central offices and/or SSP's as generally illustrated in FIG. 1. The switching office 154 may be considered to be generally similar to that described in U.S. Pat. No. 4,479,206. According to the invention there is connected to a voice and data switching network and to the control in the switching office 154 a multi-board voice recognition platform 162. The voice recognition platform 162 preferably provides an open bus architecture, such as the standard EIA bus, to which are connected multiple resources indicated at 164–186, fed by a front end 188. The resources associated with the platform 162 may be concentrated as shown in FIG. 2 or may be distributed and connected by a suitable LAN.

Resources 164–186 preferably constitute voice recognition devices or "boards" having different capabilities or efficiencies in handling specific recognition situations. That is, the resources may provide varying degrees of reliability under differing circumstances. For example, one board or device may provide the most reliable recognition of numbers or digits, another may provide high reliability for recognizing letters of the alphabet, another may provide high reliability in a specific limited vocabulary, still another may provide high reliability with respect to specific ethnically accented English, another may provide high reliability with respect to the slurred speech of an inebriated person, another may provide high reliability for a specific gender, etc. It will be understood that these devices are constructed in a known manner by creating the desired templates based on empiric work based on sampling the desired speech models. Still other resources may be devoted to different languages, it being a feature of the invention that automation may indicate the preferability of requesting the caller to use his/her native language. Other resources may be devoted to authentication and verification. Thus resources can be provided for speaker dependent recognition on a general vocabulary basis or speaker dependent recognition of words, passwords or numbers. An open bus architecture platform of this general nature is presently provided by VoicePlex Corporation of Irving, Tex. under the product name of VoicePac. The platform 162 is connected to the ISCP 140 through data link 190 to provide ISCP control thereof.

The ISCP may be used to perform virtually all of the control functions of the front end 188 or, in the alternative, the ISCP participation can be minimized by utilizing an intelligent peripheral as the front end. Also, the audio response unit and voice processing unit incorporated in the switching office of the Padden et al. U.S. Pat. No. 4,979,206 may be included in an intelligent front end 188. With control provided by either the ISCP and/or the front end or intelligent peripheral, the resource platform provides interaction which is not limited to the initial selection of a resource but which may also continually select between the different resources dependent upon control signals dictated by the point in the transaction (PICT). Thus different resources may be called into use dependent upon the expected use of digits, alphabet, speaker recognition, password recognition, etc. Illustrative suppliers of voice recognition resources include Texas Instruments, Northern Telecom, Dialogic, Voice Processing Corporation (VPC), and others. A selection may be driven not only by the nature of the recognition problem but also by behavioral aspects of a given transaction. Thus the state of anxiety of a speaker may be judged by the pitch of the voice with an increase in anxiety rate being indicated by an increase in voice pitch. The ISCP or intelligent peripheral on detecting such a change may dictate selection of a different appropriate resource.

According to the present invention there is provided still additional sensing of mental and physical condition of a caller to permit proactive passive reaction of the system to biometric parameters. Such parameters may also be used actively to permit even more accurate assessment of and reaction to the condition of a caller. This not only permits more reliable voice recognition but also makes it possible to provide early emergency assistance.

The selection process reaction to the control signals from the ISCP or intelligent peripheral in addition to selecting the appropriate resource also selects the schedule of prompts (instructions or inquiries).

If the database constructed for the purpose of making the appropriate resource choice on the basis of passive features is inconclusive, a second or active step procedure may be initiated. In an illustrative example this occurs where the passive procedures carried out under the control of the ISCP or intelligent peripheral indicate that the result is insufficiently certain. In that event the ISCP or intelligent peripheral sends a signal to initiate a prompt in the form of a query to solicit user response that can be analyzed to aid in the resource selection process. The inquiry may solicit a response which will provide a sample of speech aimed particularly at categorizing the user. The particular word or words of speech would be selected for that purpose and may not be truly germane to the call but used strictly for recognition purposes. For example, the passive analysis may provide an inconclusive indication of the native language of the speaker. This result may be used to trigger an inquiry to the caller requesting a "yes" or "no" confirmation of that tentative conclusion. The inquiry itself may be couched in the tentatively selected language if the degree of certainty reaches a predetermined point. If the caller confirms the identity of the language the controller (ISCP or intelligent peripheral) can then dictate the selection of the appropriate resource for that language as well as the schedule of prompts. Thus a two-fold selection is made.

In addition to the foregoing the present invention permits the passive results to trigger a request for the speaking of a word or phrase which will permit a deep breath test for sobriety or inebriation as well as the degree thereof.

Figure 3:
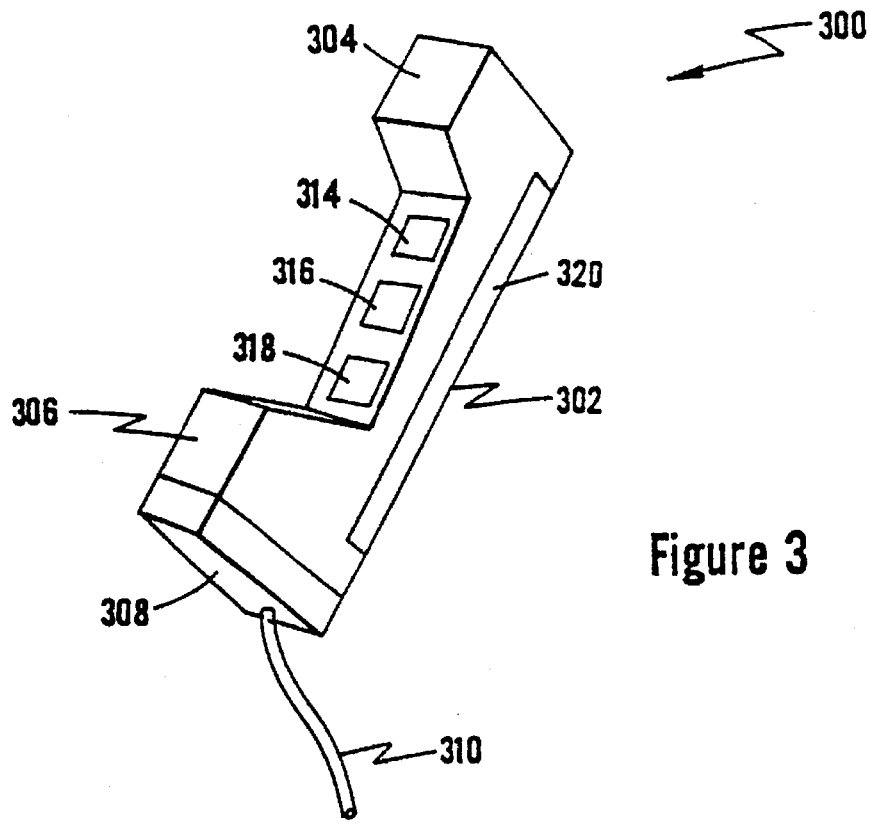
FIG. 3 is a perspective view of a handset having biometric sensors for use in the invention.

According to FIG. 3 there is shown a telephone handset 300 which includes biometric sensing apparatus. The handset has the conventional handle portion 302, ear piece 304 and mouth piece 306. Affixed to the mouth piece, either separately or integrally is a breath tester 308 which is aesthetically designed to be as unobtrusive as possible. The conventional handset cable 310 includes not only the normal network connections but also all connections to the biometric sensing devices. The breath tester is specifically designed to test for the presence of alcohol and may comprise a modified Alert Model J-4 which is commercially available and manufactured by Alcoholic Countermeasure Systems, Inc. of Mississiauga, Ontario, Canada. The breath tester 308 includes an alcohol sensor such as a Figaro Engineering Co. Model TGS109 Tin Oxide Semiconductor Gas Sensor which measures the alcohol content of the sample. The microcircuitry for translating the sensed signal into a digital signal is included within the tester 308 which produces a digital output signal to provide a measure of the alcohol content of the breath of the handset user. The invention comprehends that the breath testing may be of both a passive and active type with the former occurring without specific instructions to the caller and the latter involving a request that the caller either pronounce specifically selected words to provide a deep breath sample or that the caller deeply exhale for this purpose. Other exemplary breath testing arrangements suitable for incorporation into the device are described in U.S. Pat. Nos. 3,764,270, 3,842,345, 3,809,067, 3,903,726, 4,093,945, 4,613,845, 4,843,377.

The signal outputted by the breath tester 308 is connected to the head end 188 to supply an additional factor to aid in profiling the identity and condition of the caller. In cases of extreme inebriation the alcohol level sensed passively by the breath detector provides a proactive warning and supplies an additional passive aid in profiling the caller. The head end 188 may be suitably programmed to react to an extreme level of inebriation by immediate connection to a live operator for active communication with the caller to complete the call if feasible, to advise the caller that the call cannot be completed, or in extreme circumstances to initiate a 911 alert to either or both an emergency assistance service or police. In the case of lesser degrees of inebriation the passive breath testing stage may aid in selecting a previously prepared inebriation templet designed to aid in recognition and interpretation of callers in varying degrees of inebriation. The platform 162 may be provided with one or more templets of this type tailored to aid in deciphering conversations with inebriated callers having various types of accents and/or vocabularies. If it is deemed desirable the operator may request the caller to speak words preselected to produce a deep breath sample or request the caller to deeply exhale. Alternatively, automated prompts may be provided for this purpose in automated reaction to the sensing of predetermined levels of inebriation prior to switching the call to a live operator.

Where the invention is being utilized in a home incarceration or confinement capacity and the confined person has a history or alcoholism it is possible to prepare and provide speaker dependent, inebriation dependent voice recognition templates. The breath testing may trigger the use of a series of prompts intended to request the incarcerated caller to speak specific words which were previously utilized in the preparation of templates designed to aid in detecting the degree of inebriation. The speaker dependent voice verification template can be used to verify that the user or caller is continuing to personally speak and has not attempted to have another submit to the active inebriation test.

Figure 4:
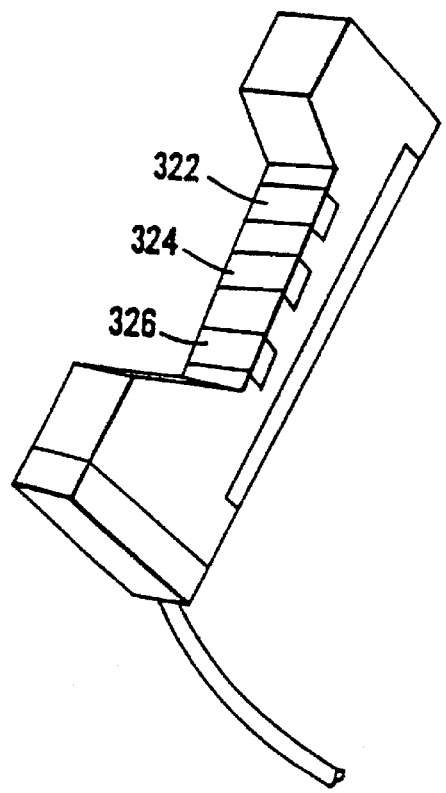
FIG. 4 is a perspective view of another embodiment of a handset having integral biometric sensors.

In addition to the breath tester 308 the handset 300 is provided with a series of electrodes 314, 316, 318, and 320 (and an electrode corresponding to electrode 320 on the opposite side of the handset not visible in FIG. 3). The electrode 320 is elongated and may be configured to extend completely around the rear side of the handset to the opposite side to act as a common electrode which is virtually certain to be contacted by the hand of the handset user. The electrodes 314, 316 and 318 are provided as spaced electrodes intended for contact with distinct fingers of the user. According to another embodiment, these electrodes may also extend around the handset in the manner illustrated at 322, 324 and 326 in FIG. 4. The spaced and separate electrodes provided in this manner are effective to provide pulse, blood pressure, and EKG information in a known manner as described, for example, in U.S. Pat. No. 5,172,698.

The electrodes are preferably mounted on the handset in such a manner as to be as unobtrusive as possible, for example, to appear as aesthetic decoration. Alternatively, the form of the entire telephone station may be stylized so that the appearance of the electrodes creates the impression of decoration rather than scientific instrumentation. With such an arrangement it is possible to conduct at least limited biometric tests in a passive manner without or prior to the initiation of active profiling steps on an interactive basis with the caller. The results of such tests serve as an aid in profiling the condition, state of mind, state of anxiety and the like, of the caller. Such information may be utilized by the head end or the ISCP to factor into the process of selecting the optimal available voice recognition device or combination of such devices. In the case of home incarceration the same information may be subjectively profiled to the incarcerated individual and used as an added means of ensuring reliability of identification. As previously described in connection with the breath detector, it is also possible to utilize the information from the biometric sensors in extreme conditions as a means of sensing the desirability of summoning emergency medical assistance.

In addition to the foregoing, the telephone station may be provided with available optical or camera fittings to permit lip reading to produce a second signal with added intelligence to supplement that obtained from the audio response.

Figure 5:
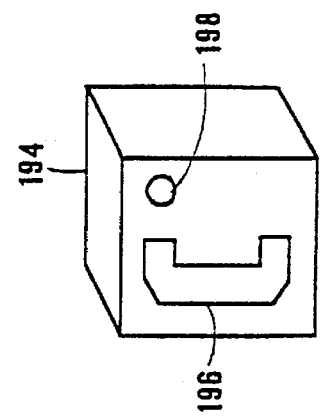
FIG. 5 is a diagrammatic illustration of a public telephone station equipped with a camera lens which acts as a sensor to provide additional passively obtained information.

Digital cameras are available for this purpose and can provide a digital signal subject to decoding in a decoder located at any suitable site such as with the resource platform or the ISCP. The speech recognition process may then be based on the parallel outputs of resources reading the audio and video signals. Such a decoder is indicated diagrammatically at 192 in the ISCP 140. A telephone station having such a camera is shown in FIG. 5 wherein the station is indicted at 194, the handset at 196, and the camera at 198.

Figure 6:
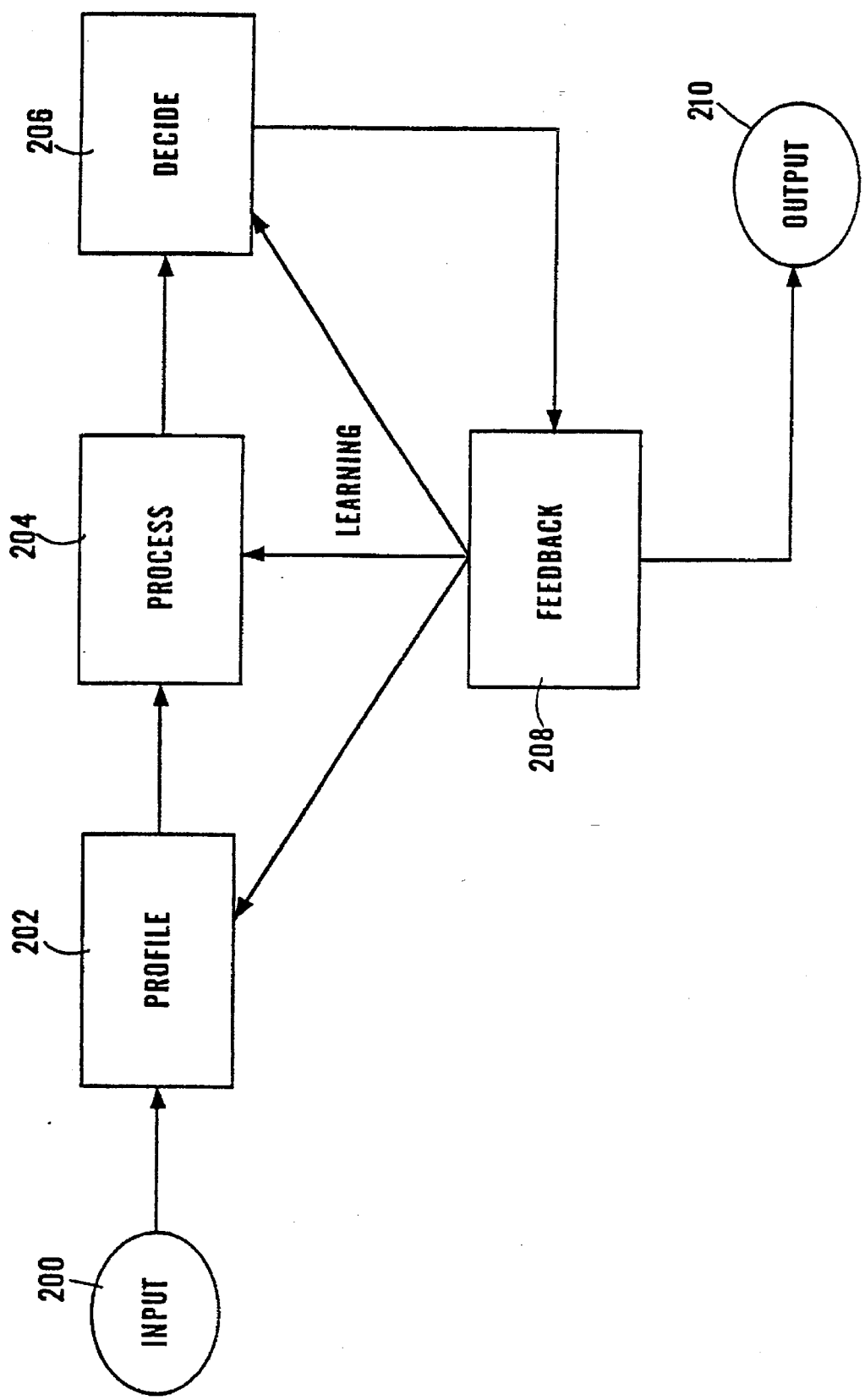
FIG. 6 is a high level process flow diagram for the intelligent recognition system of the invention.

Referring to FIG. 6 there is shown a high level process flow for the intelligent recognition system of the invention. The caller input is indicated at 200. Initially the simple lifting of the handset creates an off-hook condition and may initiate biometric sensing. The profile step is shown at 202 and the recognition process at 204. The decision (tentative or final) occurs at 206 which may result in feedback 208 in a tentative situation, and ultimately to the output data signal resulting from translation of the voice at 210.

Figure 7:
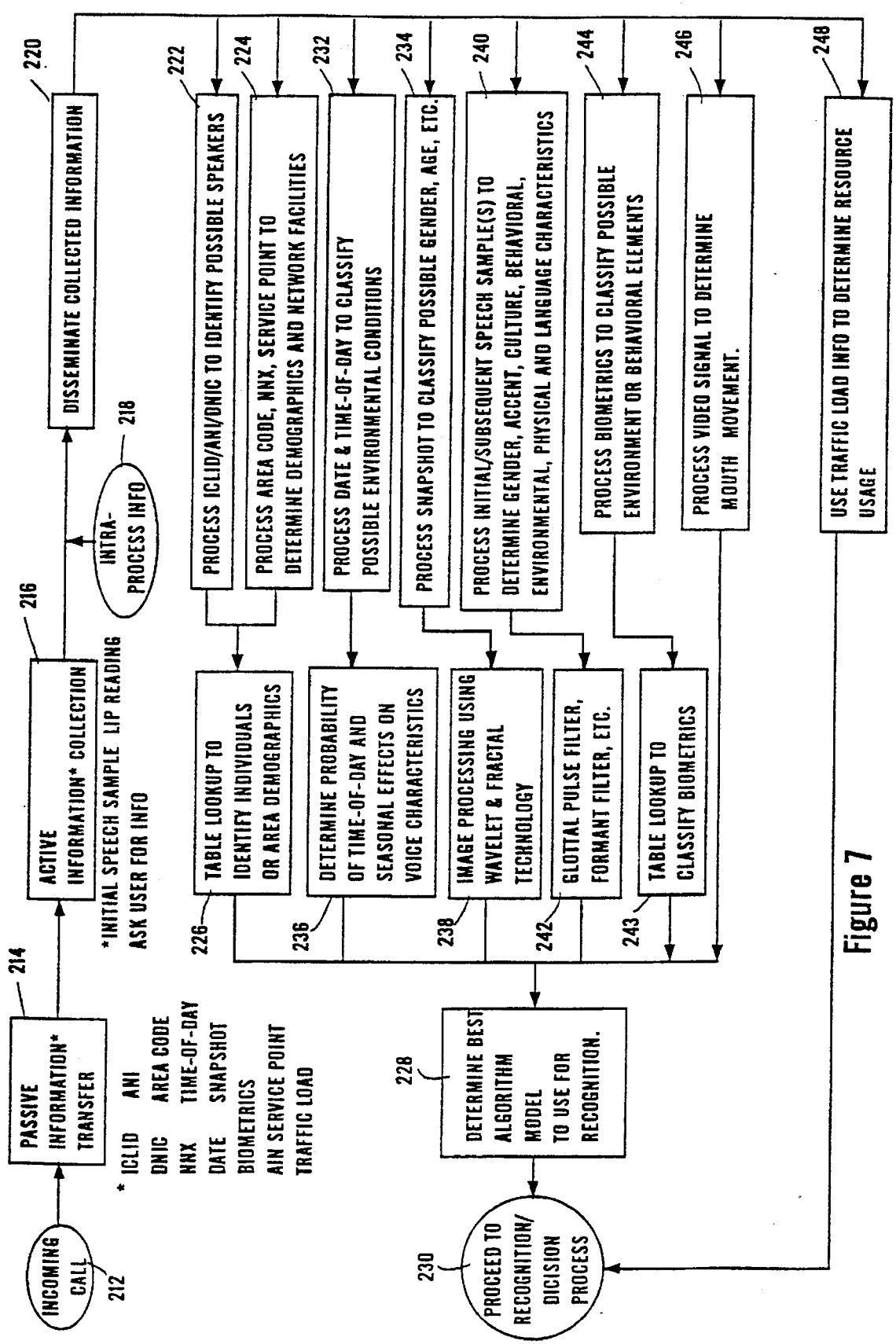
FIG. 7 is a process flow diagram illustrating the profiling procedure.

FIG. 7 illustrates the profiling process flow. Thus the incoming call is shown at 212, passive information transfer at 214, active information collection at 216, intra-process information at 218, and dissemination of collected information at 220. Collected information such as the identity of the calling station obtained via ICLID, ANI or DNIC is processed at 222. Similarly, identification may be via the area code, NNX, or service point indicated as being processed at 224. Other collected information such as biometric input may be processed at 244. The profiling inputs 222 and 224 are fed to the lookup table or database as indicated at 226 to determine the best demographically selected algorithm model or resource to use for recognition as shown at 228. The biometric profiling inputs 244 are fed to the lookup table or database indicated at 243 to determine the best biometrically selected algorithm or resource as shown at 228. This results in the selection of the algorithm or combination of algorithms being utilized to conclude the recognition process and generation of the output signal at 230.

Other factors which may be utilized in a profiling procedure are the date and time of day to classify possible environmental conditions indicated at 232, and the output of the camera indicated at 234. These are processed at 236 and 238 respectively to provide further input into the determination of the best algorithm model at 228. Such processing may be serial or parallel as previously described. Other factors which may aid in selecting the optimal resource include the determination of gender, accent, culture, behavioral, environmental, physical and language characteristics indicated at 240 and processed at 242. Still further variables capable of being sensed and utilized in the procedure are biometrics indicated at 244 and processing of the video signals as in lip reading indicated at 246. The sensing of traffic load information to determine the degree of resource usage is indicated at 248 and provides assistance in determining whether low traffic load and resource utilization would permit parallel resource use.

Figure 8:
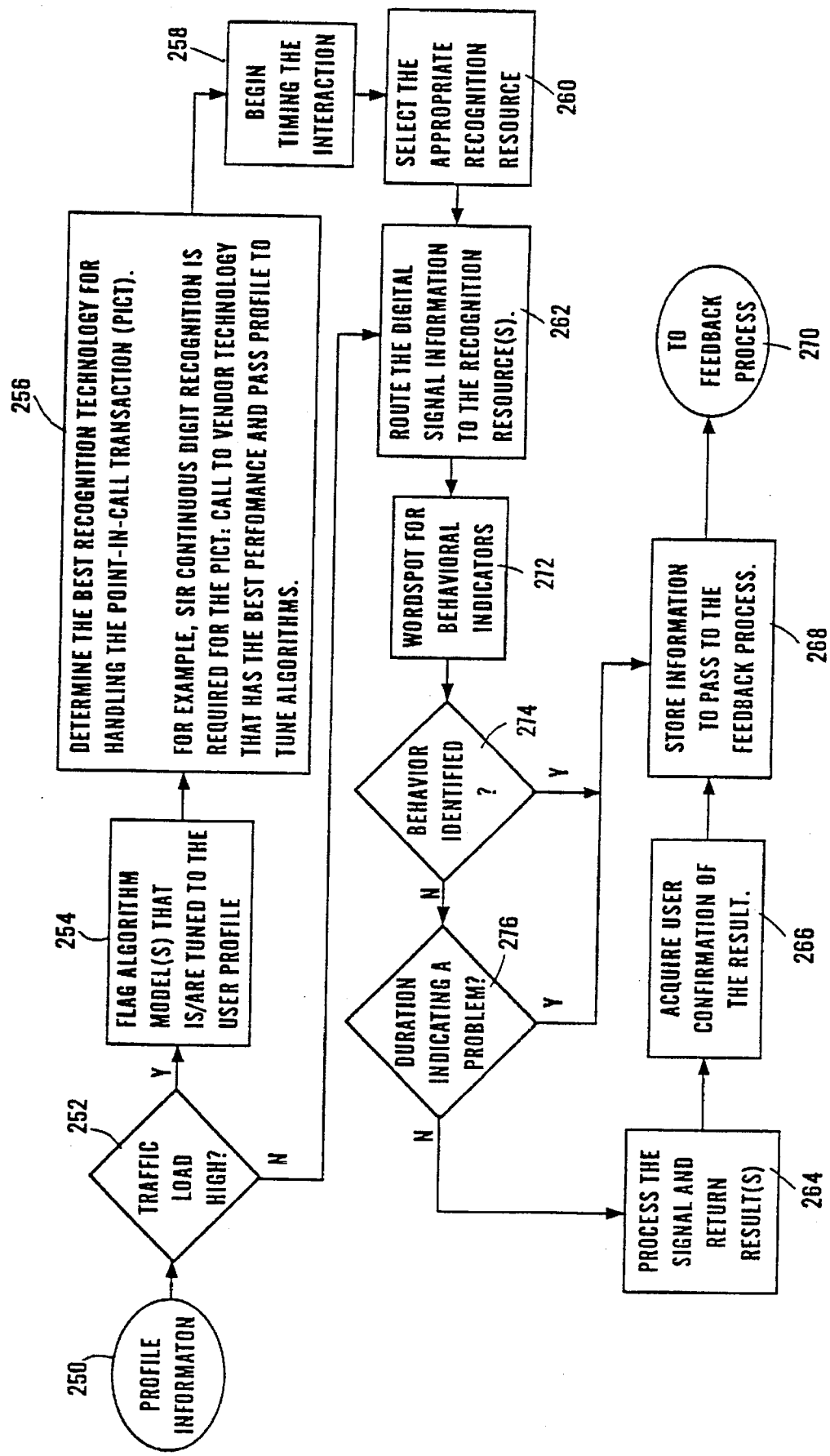
FIG. 8 is a flow diagram illustrating interaction in the process flow of the intelligent recognition system.

The interaction process is shown in flow diagram form in FIG. 8. Referring to that figure the profile information which results from the profiling process flow of FIG. 7 is indicated at 250. At 252 a determination is made as to whether the traffic load is too high and, if so, the appropriate initial resource or algorithm is selected at 254. At 256 further determination is made as to the best recognition technology for handling the point-in-call transaction (PICT), i.e., the specific intelligence being delivered at that time or point in the call. Thus if the PICT involves digit recognition the optimal resource for that process is selected. At 258 the processing using the initial resource commences and timing begins with actual selection occurring at 260 and the signal being routed to the selected resource at 262. Ignoring the behavioral steps for the time being, the signal from the resource is processed and the results provided at 264. The confirmation of the user may be obtained at 266 through the use of appropriate prompts, and information stored at 268 to pass to the feedback process at 270.

The behavioral determination aspect of the invention is indicated at 272, 274 and 276. Thus at 272 a suitable database is utilized to spot or recognize preselected words indicative of anxiety or other behavioral status. These may be words such as "damn", "damnit" or other indications of annoyance or agitation, or words such as "please" indicating a pleasant disposition. On spotting such words in a suitable word recognition resource, a determination may be made at 274 as to whether a particular behavior can be identified. If this occurs at 274 a signal is passed into the feedback process at 268. This may result in a change in the series of prompts then used with the caller or may result in directing the call to an operator. If the behavior determination step at 274 is indeterminate and the process continues, a further determination point is reached at 276 as to whether the time of processing, which began at 258, has progressed to the point where a problem is indicated. If this occurs there is a signal to the feedback processes at 268 which triggers an appropriate reaction such as possible referral to a live operator.

From the foregoing it may be seen that the invention provides an architecture and method for using known individual devices and processes for implementing an approach to universal speech recognition with a high degree of reliability even including speaker authentication. Such an ability renders the methodology applicable to a wide range of applications not only in processing PSTN services but also to such diverse problems as effective home incarceration. This is effective utilizing a two-step passive and active procedure wherein the passive step is completely transparent to the user and the active step may be transparent to the user at least partially with respect to the activity. The architecture of the system includes an intelligent recognition platform containing multiple voice recognition resources having varying abilities so as to provide an instantaneous choice of the most appropriate resource for the type of recognition involved.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a switching system for connecting a calling station to a called station a method of establishing completion of said connection comprising the steps of:
   responsive to said calling station going off-hook, establishing the identity of said calling station and using information related to the established identity to address a data base;
   responsive to the caller using the handset at said calling station sensing biometric information regarding the caller and using said biometric information to address a data base;
   selecting from a plurality of speech recognition resources a resource indicated by at least one of said identity and biometric information;

establishing connection between said off-hook station and a voice platform;.

inputting a spoken command from a caller at said calling station to said voice platform;

outputting from said plurality of speech recognition resources an output signal representing said spoken command received by said voice platform for use in establishing completion of said connection;

responsive to said spoken command sensing additional biometric information regarding the caller and using said additional biometric information to address a data base; and outputting from said plurality of speech recognition resources an output signal representing said spoken command;

wherein said output signal is produced by at least one of said selected resources based on an evaluation of at least all sensed biometric information.

2. A method according to claim 1 including the steps of:

deriving from the information from the data base identifying the calling station demographic information; and said output signal being produced by at least one of said selected resources based on evaluation of said demographic and said biometric information.

3. A method according to claim 1 wherein said biometric information includes information of multiple biometric types.

4. A method according to claim 3 wherein said biometric information includes information resulting from a breath test.

5. A method according to claim 4 wherein said biometric information also includes information resulting from cardiac sensing.

6. A method according to claim 3 wherein said biometric information includes information resulting from cardiac sensing.

7. A method according to claim 3 wherein said biometric information includes information resulting from a plurality of breath tests.

8. A method according to claim 7 wherein said breath tests include tests both before and after connection.

9. In a switching system for connecting a calling station to a called station a method of establishing completion of said connection comprising the steps of:

responsive to said calling station going off-hook, establishing the identity of said calling station and using information related to the established identity to address a data base;

responsive to the caller using the handset at said calling station sensing biometric information regarding the caller and using said biometric information to address a data base;

selecting from a plurality of speech recognition resources a resource indicated by at least one of said identity and biometric information;

establishing connection between said off-hook station and a voice platform;.

inputting a spoken command from a caller at said calling station to said voice platform; and outputting from said plurality of speech recognition resources an output signal representing said spoken command received by said voice platform for use in establishing completion of said connection;

wherein said biometric sensing is accomplished at least in part by the caller grasping said handset;

selecting from said plurality of speech recognition resources a second resource responsive to said output signal;

outputting from said plurality of speech recognition resources a second output signal;

inputting a second spoken command from said caller at said calling station to said second resource; and outputting from said plurality of speech recognition resources a third output signal responsive to the second spoken command.

10. A method according to claim 9 including the steps of:

responsive to said second output signal selecting an audio request from a plurality of preestablished audio requests and outputting to said caller said selected audio request requesting said second command; and said caller inputting said second spoken command responsive to said selected audio request.

11. A method according to claim 10 including the steps of:

requesting in said second audio request a spoken command of a type to elicit a response to provide deep breath sensing for an active sensing apparatus.

12. A method according to claim 10 wherein said selection of audio requests is based at least in part on biometric information.

13. A method according to claim 12 wherein said biometric information is based on sensing at said handset other than oral sensing.

14. A method according to claim 13 wherein said sensing at said handset other than oral sensing is at least partially derived by electrodes associated with said handset and contacted by the caller.

15. In a Public Switched Telephone Network (PSTN) which includes Common Channel Signaling/CCS) and a Signal Control Point (SCP), a method of completing a call from a calling station to a called station comprising the steps of:

responsive to said calling station going off-hook, establishing the identity of said calling station through said CCS pursuant to the functioning of said PSTN;

using said identity of said calling station to address a data base associated with said SCP;

deriving from said data base information relating to demographics of said calling station;

sensing from said calling station biometric information relating to said caller;

selecting from a plurality of recognition resources a resource indicated by at least one of said demographic information and said biometric information;

establishing a connection to said off-hook station;

inputting a spoken command from a caller at said calling station to said selected resource;

sensing from said calling station additional biometric information relating to said caller and generating a signal representative thereof;

outputting to said caller an audio signal selected from a plurality of preestablished audio signals based on at least one of (a) audio sensing of said spoken command and (b) biometric sensing;

inputting a second spoken command from said caller responsive to said audio signal outputted to said caller;

outputting from said plurality of resources a second output signal responsive to said second spoken command;

determining the degree of traffic through said plurality of resources;

comparing the determined degree of traffic to a predetermined traffic load; and responsive to said determined degree of traffic being below said predetermined load, inputting at least one of said spoken commands to a plurality of said resources in parallel.

16. In a switching system for connecting a calling station to a called station a method of establishing completion of said connection comprising the steps of:

responsive to said calling station going off-hook, establishing the identity of said calling station and using information related to the established identity to address a data base;

responsive to the caller using the handset at said calling station sensing biometric information regarding the caller and using said biometric information to address a data base;

selecting from a plurality of speech recognition resources a resource indicated by at least one of said identity and biometric information;

establishing connection between said off-hook station and a voice platform;

inputting a spoken command from a caller at said calling station to said voice platform; and outputting from said plurality of speech recognition resources an output signal representing said spoken command received by said voice platform for use in establishing completion of said connection;

wherein said selecting step comprises the step of selecting said resource in response to said identity information and said biometric information.

17. The method of claim 16 including the steps of:

deriving demographic information from the information from the data base identifying the calling station;

said output signal being produced by at least one of said selected resources based on evaluation of said demographic and said biometric information.

18. A method according to claim 16 wherein said biometric information includes information of multiple biometric types.

19. A method according to claim 18 wherein said biometric information includes information resulting from a breath test.

20. A method according to claim 18 wherein said biometric information includes information resulting from cardiac sensing.

21. In a Public Switched Telephone Network (PSTN) which includes Common Channel Signaling (CCS) and a Signal Control Point (SCP), a method of completing a call from a calling station to a called station comprising the steps of:

responsive to said calling station going off-hook, establishing the identity of said calling station through said CCS pursuant to the functioning of said PSTN;

using said identity of said calling station to address a data base associated with said SCP;

deriving from said data base information relating to demographics of said calling station;

sensing from said calling station biometric information relating to said caller;

selecting from a plurality of recognition resources a resource indicated by at least one of said demographic information and said biometric information;

establishing a connection to said off-hook station;

inputting a spoken command from a caller at said calling station to said selected resource;

sensing from said calling station additional biometric information relating to said caller and generating a signal representative thereof;

outputting to said caller an audio signal selected from a plurality of preestablished audio signals based on at least one of (a) audio sensing of said spoken command and (b) biometric sensing;

inputting a second spoken command from said caller responsive to said audio signal outputted to said caller; and outputting from said plurality of resources a second output signal responsive to said second spoken command;

wherein said selecting step comprises the step of selecting said resource in response to said demographic information and said biometric information.

22. In a switching system for connecting a calling station to a called station a method of establishing completion of said connection comprising the steps of:

responsive to said calling station going off-hook, establishing the identity of said calling station and using information related to the established identity to address a data base;

responsive to the caller using the handset at said calling station sensing biometric information regarding the caller and using said biometric information to address a data base;

selecting from a plurality of speech recognition resources a resource indicated by at least one of said identity and biometric information;

establishing connection between said off-hook station and a voice platform;

inputting a spoken command from a caller at said calling station to said voice platform;

outputting from said plurality of speech recognition resources an output signal representing said spoken command received by said voice platform for use in establishing completion of said connection;

wherein said selecting step comprises the step of:

tentatively selecting a primary set of said speech recognition resources to determine a tentative recognition result;

finally selecting at least one resource in response to said tentative recognition result for recognition of said spoken command.

23. In a switching system for connecting a calling station to a called station a method of establishing completion of said connection comprising the steps of:

responsive to the caller using the handset at said calling station and going off-hook sensing biometric information regarding the caller using common channel signaling and using said information to address a data base;

selecting from a plurality of speech recognition resources a resource based on said information;

establishing connection to said off-hook station;

inputting a spoken command from a caller at said calling station to said selected resource; and outputting from said plurality of speech recognition resources an output signal representing said spoken command;

wherein said selecting step comprises the steps of:

tentatively selecting a primary set of said speech recognition resources to determine a tentative recognition result;

finally selecting said at least one resource in response to said tentative recognition result for recognition of said spoken command.

24. A method for recognizing a spoken command from a calling station to complete a call connection in a public switched telephone network, the method comprising the steps of:

establishing an identity of the calling station in response to a detected off-hook condition of the calling station and accessing a database for profile information in response to the established identity;

sensing biometric information of a caller using said calling station in response to the detected off-hook condition;

selecting at least one speech recognition resource from a plurality of speech recognition resources in response to at least one of said profile information and said biometric information;

initiating an interface session between the caller and a voice platform;

receiving the spoken command during said interface session and providing the spoken command from the voice platform to the at least one selected speech recognition resource; and outputting from the at least one selected speech recognition resource a command signal representing the spoken command;

wherein said selecting step comprises the steps of:

first processing a speech sample received during said interface session to obtain said biometric information of the caller;

second processing said speech sample to obtain language characteristics of said caller;

selecting the at least one selected speech recognition resource in response to at least one of said profile information, said biometric information and said language characteristics.

25. A method as in claim 24, wherein said step of first processing the speech sample comprises the step of determining at least a gender of said caller as said biometric information.

26. A method as in claim 24, wherein said step of second processing the speech sample comprises the step of accessing a database storing predetermined words indicative of behavioral status to determine an emotional state of said caller.

27. A method for recognizing a spoken command from a calling station to complete a call connection in a public switched telephone network, the method comprising the steps of:

establishing an identity of the calling station in response to a detected off-hook condition of the calling station and accessing a database for profile information in response to the established identity;

sensing biometric information of a caller using said calling station in response to the detected off-hook condition;

selecting at least one speech recognition resource from a plurality of speech recognition resources in response to at least one of said profile information and said biometric information;

initiating an interface session between the caller and a voice platform;

receiving the spoken command during said interface session and providing the spoken command from the voice platform to the at least one selected speech recognition resource; and outputting from the at least one selected speech recognition resource a command signal representing the spoken command;

wherein said biometric information sensing step comprises the step of obtaining an optical representation of said caller;

wherein the step of obtaining an optical representation of said caller includes the step of performing image processing on the optical representation to identify physical characteristics of said caller including at least one of gender and age.

28. A method as in claim 27, wherein the step of obtaining an optical representation of said caller includes the step of processing a video signal of the caller at the calling station to determine mouth movement.

29. A method for recognizing a spoken command from a calling station to complete a call connection in a public switched telephone network, the method comprising the steps of:

establishing an identity of the calling station in response to a detected off-hook condition of the calling station and accessing a database for profile information in response to the established identity;

sensing biometric information of a caller using said calling station in response to the detected off-hook condition;

selecting at least one speech recognition resource from a plurality of speech recognition resources in response to at least one of said profile information and said biometric information;

initiating an interface session between the caller and a voice platform;

receiving the spoken command during said interface session and providing the spoken command from the voice platform to the at least one selected speech recognition resource; and outputting from the at least one selected speech recognition resource a command signal representing the spoken command;

wherein said selecting step comprises the steps of:

tentatively selecting a primary set of said speech recognition resources to determine a tentative recognition result;

finally selecting said at least one speech recognition resource in response to said tentative recognition result for recognition of said spoken command.

* * * * *